United States Patent
Lee et al.

(10) Patent No.: US 9,988,088 B2
(45) Date of Patent: Jun. 5, 2018

(54) STRUCTURE FOR CONNECTING STRUT BAR FOR VEHICLE

(71) Applicant: Hyundai Motor Company, Seoul (KR)

(72) Inventors: Doo-Hun Lee, Gyeonggi-do (KR);
Chang-Ho Park, Gyeonggi-do (KR);
Hae-Woong Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 15/251,135

(22) Filed: Aug. 30, 2016

(65) Prior Publication Data

US 2017/0137063 A1   May 18, 2017

(30) Foreign Application Priority Data

Nov. 16, 2015  (KR) .................... 10-2015-0160243

(51) Int. Cl.
*B62D 21/15*   (2006.01)
*B62D 25/08*   (2006.01)

(52) U.S. Cl.
CPC .......... *B62D 21/152* (2013.01); *B62D 25/082* (2013.01); *B62D 25/088* (2013.01)

(58) Field of Classification Search
CPC ... B62D 21/152; B62D 25/082; B62D 25/088
USPC .................................................. 296/193.09
See application file for complete search history.

(56) References Cited

U.S. PATENT DOCUMENTS

| 3,211,491 | A | * | 10/1965 | Browne | B62D 25/082 |
| | | | | | 267/292 |
| 3,625,561 | A | * | 12/1971 | Huber | B62D 25/082 |
| | | | | | 296/187.09 |
| 7,703,805 | B2 | * | 4/2010 | Sasaki | B62D 21/152 |
| | | | | | 280/784 |
| 7,770,964 | B2 | * | 8/2010 | Herntier | B62D 25/088 |
| | | | | | 280/124.109 |
| 8,128,160 | B2 | * | 3/2012 | Leanza | B62D 25/088 |
| | | | | | 296/187.09 |
| 9,022,457 | B2 | | 5/2015 | Hirano et al. | |

FOREIGN PATENT DOCUMENTS

| JP | 2009-023618 | 2/2009 |
| JP | 4797704 B2 | 10/2011 |
| KR | 10-1998-053328 A | 9/1998 |
| KR | 1999-0016742 | 5/1999 |
| KR | 1999-0038078 | 10/1999 |
| KR | 10-2008-0047498 A | 5/2008 |

* cited by examiner

*Primary Examiner* — Joseph D. Pape
(74) *Attorney, Agent, or Firm* — Mintz Levin Cohn Ferris Glovsky and Popeo, P.C.; Peter F. Corless (57) ABSTRACT

A structure for connecting a strut bar is provided to reinforce lateral rigidity of an engine room of a vehicle. The structure includes a first strut bar that has a first end coupled to a dash panel of a vehicle and a second end coupled to a strut housing and a second strut bar that has a first end coupled to the dash panel and a second end coupled to the first strut bar, and is disposed to have a predetermined angle with respect to the first strut bar. Further, a connecting bar has a first end coupled to the first strut bar and a second end coupled to the second strut bar, and connects the first strut bar and the second strut bar to increase lateral rigidity of a vehicle body, diversify load paths during a collision, and tune a degree to which the dash panel is pushed.

8 Claims, 8 Drawing Sheets

FIG. 1A

PRIOR ART

FIG. 1B

PRIOR ART

FIG. 2A

PRIOR ART

FIG. 2B

PRIOR ART

STRUCTURE FOR CONNECTING STRUT BAR FOR VEHICLE

CROSS-REFERENCE TO RELATED APPLICATIONS

This application claims priority under 35 U.S.C. § 119 to Korean Patent Application No. 10-2015-0160243, filed on Nov. 16, 2015, in the Korean Intellectual Property Office, the disclosure of which is incorporated herein by reference in its entirety.

BACKGROUND

1. Field of the Invention

The present invention relates to a structure that connects a strut bar applied to reinforce lateral rigidity of an engine room of a vehicle, and more particularly, to a structure that connects a strut bar for a vehicle, in which a connecting bar connects a first strut bar and a second strut bar, thereby increasing lateral rigidity of a vehicle body, diversifying load paths during a collision, and tuning, by using a shape of a slot, a degree to which the dash panel is pushed.

2. Description of the Related Art

In general, various components are mounted within a vehicle by various methods to increase rigidity of a vehicle body. Among the components, a strut bar for a vehicle is widely utilized as a component installed within an engine room to support the vehicle body. The strut bar serves to support impact that occurs from the outside when the vehicle travels, increase stability of the vehicle body when the vehicle turns, and inhibit the engine room from being pushed into a driver seat during a vehicle collision. In a typical passenger vehicle manufactured by mass production, a plurality of strut bars is mounted in the engine room to support vehicle body members, which constitute the engine room, for the tuning purpose of improving rigidity of the vehicle body.

Figure 1A:
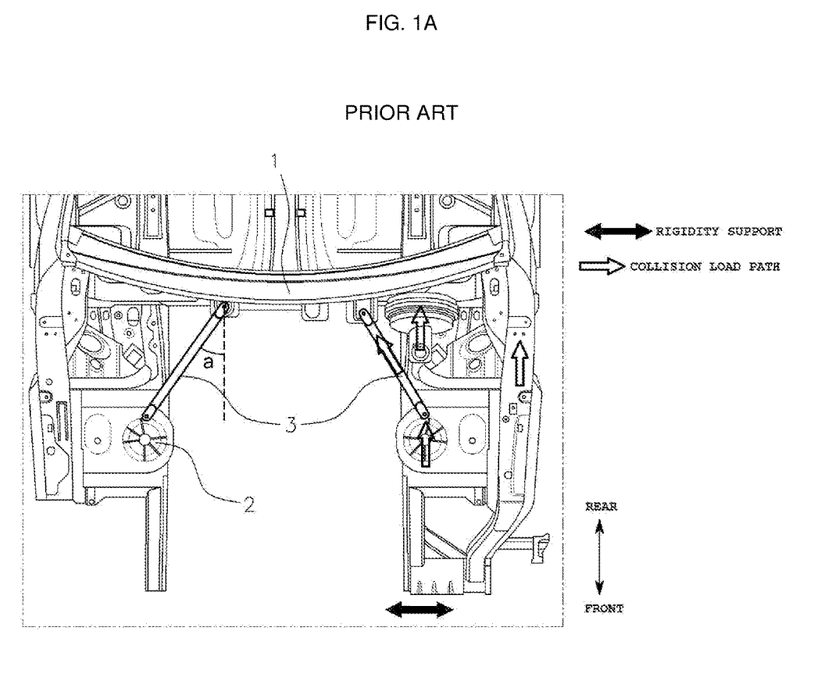
FIG. 1A is a view illustrating a structure for connecting a strut bar for a vehicle according to the related art.
Figure 1B:
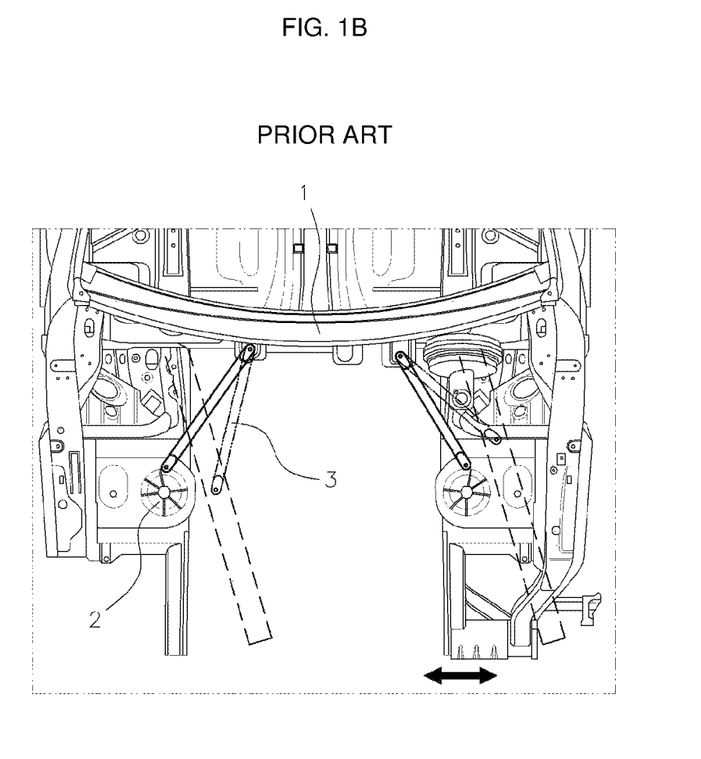
FIG. 1B is a view illustrating the structure for connecting a strut bar for a vehicle according to the related art when lateral force is generated.

FIG. 1A is a view illustrating a structure for connecting a strut bar for a vehicle according to the related art, and FIG. 1B is a view illustrating the structure for connecting a strut bar for a vehicle according to the related art when lateral force is generated. As illustrated in FIG. 1A, the structure that connects a strut bar for a vehicle in the related art includes a pair of strut bars 3, each of which has one end connected to a dash panel 1 and the other end coupled to a strut housing 2.

In particular, the strut bar 3 is disposed to have a predetermined angle a with respect to front and rear directions of the vehicle, and it is advantageous to reduce the angle a in terms of an impact load path to support a rearward movement of a strut housing. However, as illustrated in FIG. 1B, when the angle a of the strut bar is reduced (e.g., the angle a of the strut bar is reduced to about 45 degrees or less) when lateral force of the vehicle occurs (e.g., during a broadside collision), the strut bar 3 rotates as indicated by a dotted line in FIG. 1B, and as a result, performance in supporting left and right rigidity deteriorates in terms of lateral rigidity of the engine room.

Figure 2A:
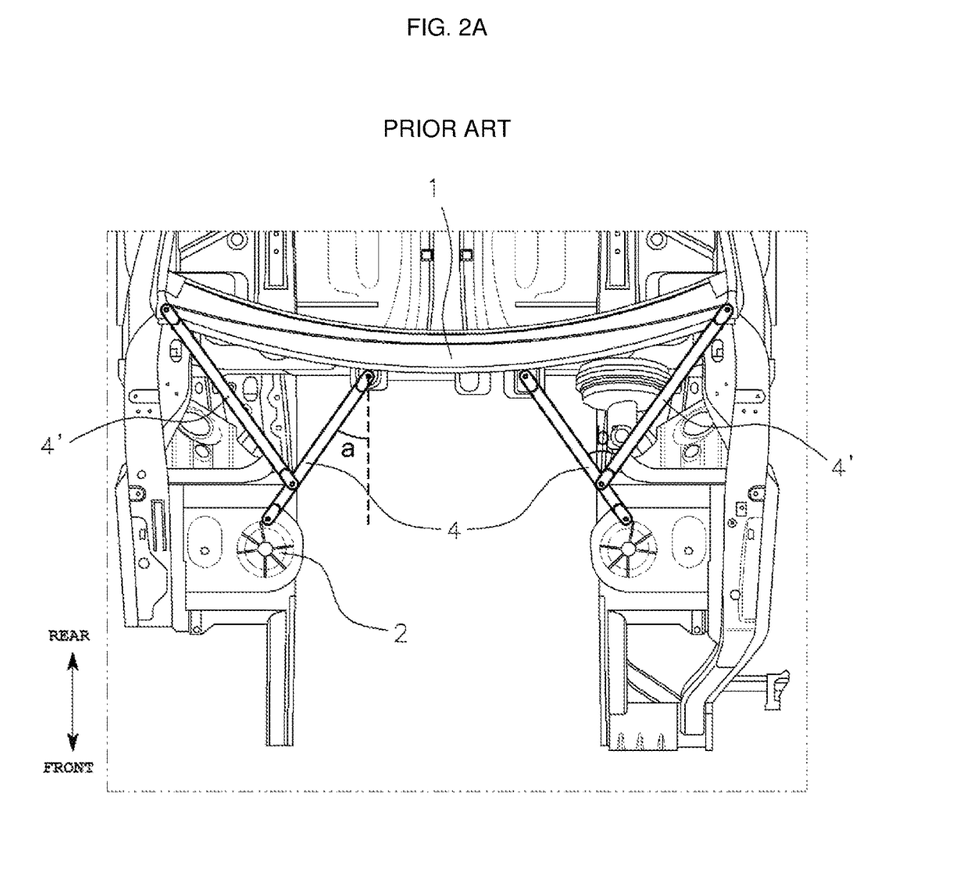
FIG. 2A is a view illustrating a structure for connecting a strut bar for a vehicle according to the related art.
Figure 2B:
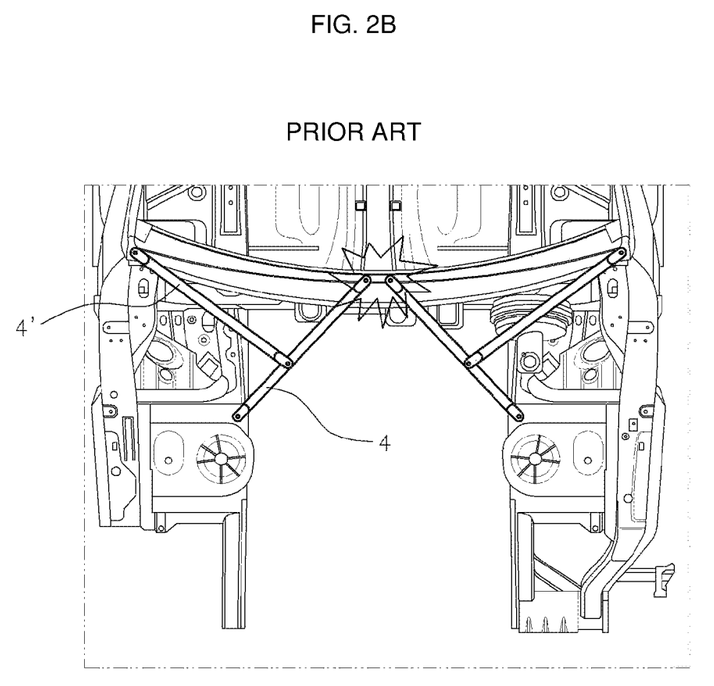
FIG. 2B is a view illustrating the structure for connecting a strut bar for a vehicle according to the related art during a head-on collision of the vehicle.

FIG. 2A is a view illustrating a structure that connects a strut bar for a vehicle according to the related art, and FIG. 2B is a view illustrating the structure that connects a strut bar for a vehicle according to the related art during a head-on collision of the vehicle. As illustrated in FIG. 2A, the structure for connecting a strut bar for a vehicle according to the related art includes a first strut bar 4 which has one end coupled to a dash panel 1 and the other end coupled to a strut housing 2, and a second strut bar 4' which has one end connected to the dash panel 1 and the other end coupled to the first strut bar 4.

In another exemplary embodiment, the second strut bar 4' is additionally installed, to further increase the angle a of the first strut bar 4 with respect to the front and rear direction of the vehicle to be greater than the angle in the aforementioned exemplary embodiment, thereby reinforcing lateral rigidity. However, as illustrated in FIG. 2B, the structure according to another exemplary embodiment has problems in that an angle b between the first strut bar 4 and the second strut bar 4' is increased during a head-on collision of a vehicle, and as a result, impact supporting force deteriorates, and a deformation amount of a dash panel is increased.

The above information disclosed in this section is merely for enhancement of understanding of the background of the invention, and therefore it should not be understood that the above information is regarded as being the prior art that has been already known to those skilled in the art.

SUMMARY

The present invention provides a structure that connects a strut bar for a vehicle, in which a connecting bar may be coupled between a first strut bar and a second strut bar to prevent an angle between the strut bars from increasing, thereby maintaining an effect of being supportive during a collision, and diversifying load paths.

The present invention also provides a structure that connects a strut bar for a vehicle, which allows a connecting bar to be slidable in a longitudinal direction of a second strut bar, thereby preventing the dash panel from being pushed due to excessive rigidity. Technical problems to be solved by the present invention are not limited to the aforementioned technical problem, and other technical problems, which are not mentioned above, may be clearly understood from the following descriptions by those skilled in the art to which the present invention pertains.

An exemplary embodiment of the present invention provides a structure for connecting a strut bar for a vehicle, the structure may include: a first strut bar having a first end coupled to a dash panel of a vehicle and a second end coupled to a strut housing; a second strut bar having a first end coupled to the dash panel and a second end coupled to the first strut bar, and may be disposed to have a predetermined angle with respect to the first strut bar; and a connecting bar having a first end coupled to the first strut bar and a second end coupled to the second strut bar, and connects the first strut bar and the second strut bar to prevent the angle between the first strut bar and the second strut bar from increasing.

In the structure for connecting a strut bar for a vehicle according to the exemplary embodiment of the present invention, the second end of the second strut bar, coupled to the first strut bar, may be pivotally connected to be rotatable. In addition, the second end of the connecting bar, coupled to the first strut bar, may be pivotally connected to be rotatable, and the second end of the connecting bar, coupled to the second strut bar, may be slidable along a longitudinal slot formed in the second strut bar.

Further, the slot formed in the second strut bar may include: an accommodating portion that accommodates a slider coupled to the second end of the connecting bar; and a movement portion connected with the accommodating portion through a connecting passage and in which the slider is slidably movable. In particular, a width of the connecting passage may be less than a diameter of the slider.

According to the present invention which has the aforementioned configuration, the connecting bar may be installed to connect the first strut bar and the second strut bar, thereby preventing an angle between the strut bars from increasing, and significantly increasing lateral rigidity of a vehicle body. According to the present invention, the connecting bar prevents the angle between the strut bars from increasing, thereby maintaining an effect of being supportive during a collision during a vehicle collision, and diversifying load paths.

According to the present invention, the connecting bar may slide along the second strut bar at the initial time of a vehicle collision, thereby preventing an increase in a degree to which the dash panel is pushed due to excessive rigidity caused by installation of the connecting bar. Additionally, it may be possible to adjust a degree to which the dash panel is pushed during a vehicle collision, based on a desired load, by variously setting a width of the connecting passage along which the slider of the connecting bar slides.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiment described herein.

A part irrelevant to the description will be omitted to clearly describe the present invention, and the same or similar constituent elements will be designated by the same reference numerals throughout the specification. Terms or words used in the specification and the claims should not be interpreted as being limited to a general and dictionary meaning and should be interpreted as a meaning and a concept which conform to the technical spirit of the present invention based on a principle that an inventor can appropriately define a concept of a term in order to describe his/her own invention by the best method.

Figure 3:
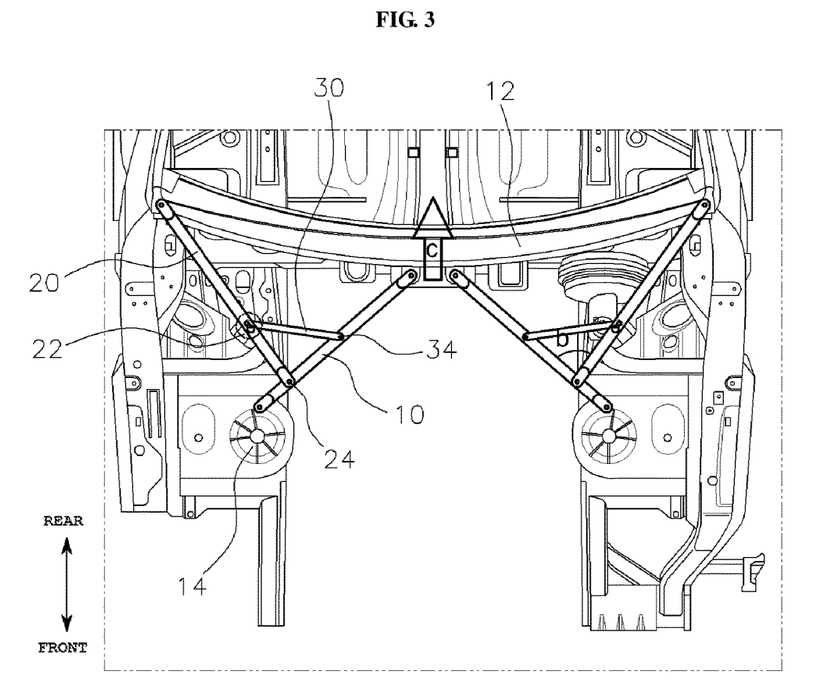
FIG. 3 is a view illustrating a structure for connecting a strut bar for a vehicle according to an exemplary embodiment of the present invention.
Figure 4:
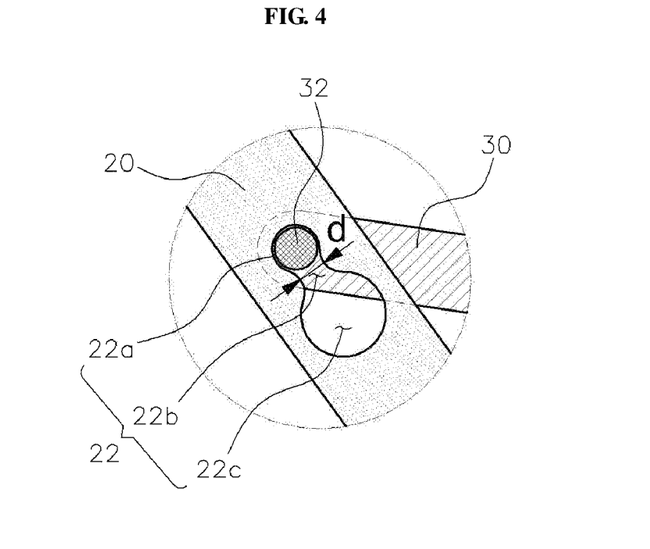
FIG. 4 is an enlarged view of part A in FIG. 3 which illustrates a coupling portion between a second strut bar and a connecting bar according to an exemplary embodiment of the present invention.

FIG. 3 is a view illustrating a structure for connecting a strut bar for a vehicle according to an exemplary embodiment of the present invention, and FIG. 4 is an enlarged view of part A in FIG. 3 which illustrates a coupling portion between a second strut bar and a connecting bar. As illustrated, the structure for connecting a strut bar for a vehicle according to an exemplary embodiment of the present invention may include a first strut bar 10 and a second strut bar 20, and the first strut bar 10 and the second strut bar 20 may be connected by a connecting bar 30.

The first strut bar 10 may be formed in a pipe shape, a first end of the first strut bar 10 may be coupled to a substantially central portion of a dash panel 12 of the vehicle, and a second end of the first strut bar 10 may be coupled to a strut housing 14 at a side of an engine room. In the illustrated exemplary embodiment, two first strut bars 10 may be installed to be symmetrical in directions of the strut housings 14 at both sides from the central portion of the dash panel 12. The first strut bar 10 may be configured to reinforce rigidity of the engine room during a vehicle collision. Similar to the first strut bar 10, the second strut bar 20 may be formed in a pipe shape, a first end of the second strut bar 20 may be coupled to an end portion of the dash panel 12, and a second end of the second strut bar 20 may be coupled to the substantially central portion of the first strut bar 10.

Further, two second strut bars 20 may be installed to be symmetrical and thus, the number of second strut bars 20 may correspond to the number of first strut bars 10, and the second strut bar 20 may have a predetermined angle b with respect to the first strut bar 10, thereby assisting in increasing rigidity of the first strut bar. In other words, as illustrated in FIG. 2A which has been described above, the second strut bar 20 may increase an angle a of the first strut bar 10 in front and rear directions of the vehicle, thereby preventing supporting force against a collision from deteriorating and reinforcing additional lateral rigidity. With the connecting bar 30 which has a first end coupled to the first strut bar 10 and a second end coupled to the second strut bar 20, the present invention may also prevent the angle b between the first strut bar 10 and the second strut bar 20 from increasing.

Meanwhile, as illustrated in FIG. 3, the second end of the second strut bar 20, coupled to the first strut bar 10, may be rotatably connected by a pivot 24, and a first end of the connecting bar 30, coupled to the first strut bar 10, may also be rotatably connected by a pivot 34. In particular, as illustrated in FIG. 4, the second end of the connecting bar 30, coupled to the second strut bar, may be slidable in the front and rear direction of the vehicle along a longitudinal slot 22 formed in the second strut bar 20.

The sliding movement of the connecting bar 30 along the slot 22 may prevent the dash panel from being pushed rearward at the initial time of a collision due to excessive rigidity caused by installation of the connecting bar. Specifically, the slot 22 formed in the second strut bar 20 may include an accommodating portion 22a that accommodates a slider 32 coupled to the second end of the connecting bar 30, and a movement portion 22c connected with the accommodating portion 22a via a connecting passage 22b and along which the slider 32 may be slidably movable (e.g., the slider 32 may slide along the movement portion 22c).

A diameter of the accommodating portion 22a may be about the same as a diameter of the slider 32, and the slider 32 of the connecting bar may be fixed to the accommodating portion 22a at normal times (e.g., when no vehicle collision occurs). A diameter of the movement portion 22c may be greater than the diameter of the slider 32 to ensure a space (e.g., sufficient space) in which the slider 32 of the connecting bar may move during a vehicle collision. In other words, the accommodating portion 22a and the movement portion 22c of the slot 22 may have an overall shape similar to a snowman shape (e.g., two connected spherical shapes), and the accommodating portion 22a and the movement portion 22c may be formed integrally by being connected via the connecting passage 22b.

Particularly, a width d of the connecting passage 22b may be less than the diameter of the slider 32 to fixedly accommodate the slider 32 in the accommodating portion 22a at normal times and to allow the slider 32 to move during a collision. The width d of the connecting passage 22b may be variously set based on required rigidity of a vehicle body, a degree to which the dash panel is pushed during a vehicle collision, an angular relationship between the first strut bar and the second strut bar, and the like.

Figure 5:
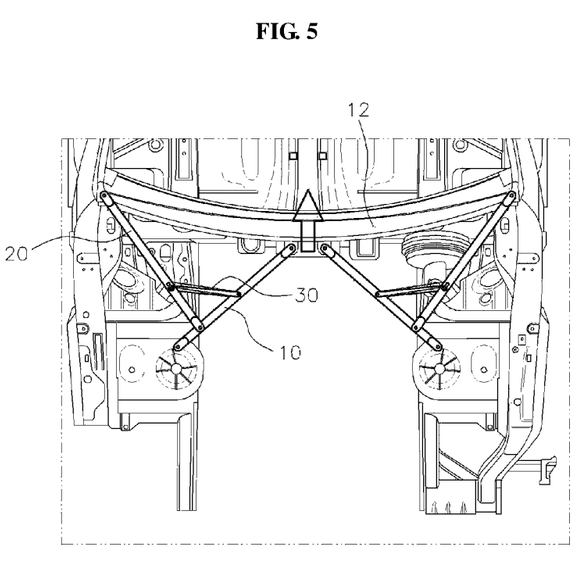
FIG. 5 is a view illustrating the structure for connecting a strut bar according to the exemplary embodiment of the present invention at the initial time of a vehicle collision.
Figure 6:
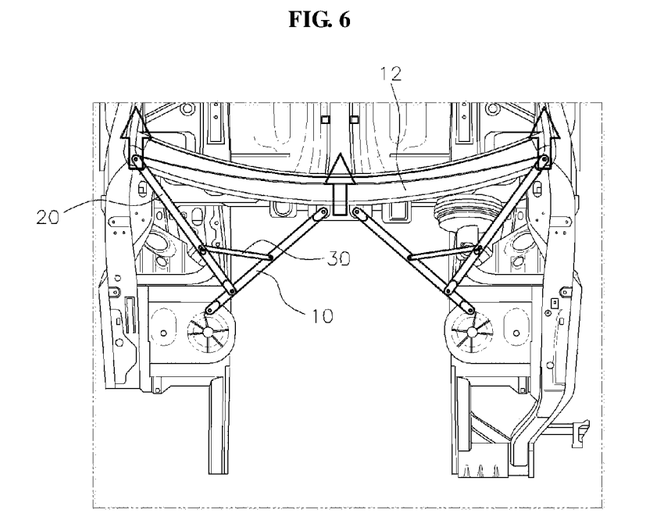
FIG. 6 is a view illustrating the structure for connecting a strut bar according to the exemplary embodiment of the present invention after the vehicle collision.

FIG. 5 is a view illustrating the structure for connecting a strut bar according to the exemplary embodiment of the present invention at the initial time of a vehicle collision, and FIG. 6 is a view illustrating the structure for connecting a strut bar according to the exemplary embodiment of the present invention after the vehicle collision. In general, at the initial time of a head-on collision of a vehicle, impact transmitted from a front side of the vehicle body may be transmitted to the first strut bar 10 and the second strut bar 20, and the dash panel 12 may be pushed rearward.

However, as illustrated in FIGS. 4 and 5, the end of the connecting bar 30 according to the present invention may be configured to slide forward along the slot 22 of the second strut bar 20, and by the withdrawal of mounting (indicated by a dotted line in FIG. 5) of the connecting bar 30, a degree to which the dash panel 12 is pushed rearward may be reduced. As illustrated in FIG. 2B, when the angle b between the first strut bar and the second strut bar is excessively increased after the vehicle collision, the strut bar does not withstand impact and is pushed rearward, and as a result, a deformation amount of the dash panel may be increased.

However, as illustrated in FIG. 6, in the present invention, the connecting bar 30 may prevent the angle between the first strut bar 10 and the second strut bar 20 from increasing, and as a result, it may be possible to maintain an effect of being supportive during both side collisions even after the collision, and it may be possible to diversify load paths as illustrated by arrows in FIG. 6.

Accordingly, the present invention may significantly increase lateral rigidity of the vehicle body in comparison with the related art, may diversify load paths during a collision, and may reduce a degree to which the dash panel is pushed rearward by distributing impact loads by using the withdrawal of mounting of the connecting bar.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. A structure for connecting a strut bar for a vehicle, comprising:
    a first strut bar having a first end coupled to a dash panel of the vehicle and a second end coupled to a strut housing;
    a second strut bar having a first end coupled to the dash panel and a second end coupled to the first strut bar, and is disposed to have a predetermined angle with respect to the first strut bar; and
    a connecting bar having a first end coupled to the first strut bar and a second end coupled to the second strut bar, and is configured to connect the first strut bar and the second strut bar to prevent the angle between the first strut bar and the second strut bar from increasing.

2. The structure of claim 1, wherein the second end of the second strut bar, coupled to the first strut bar, is pivotally connected to be rotatable.

3. The structure of claim 1, wherein the first end of the connecting bar, coupled to the first strut bar, is pivotally connected to be rotatable, and the second end of the connecting bar, coupled to the second strut bar, is slidable along a longitudinal slot formed in the second strut bar.

4. The structure of claim 3, wherein the slot formed in the second strut bar includes:
    an accommodating portion that accommodates a slider coupled to the second end of the connecting bar; and
    a movement portion connected with the accommodating portion via a connecting passage and in which the slider is slidably movable.

5. The structure of claim 4, wherein a width of the connecting passage is less than a diameter of the slider.

6. The structure of claim 4, wherein a diameter of the accommodating portion is about the same as the diameter of the slider and the slider is fixed to the accommodating portion when no vehicle collision occurs.

7. The structure of claim 4, wherein a diameter of the movement portion is greater than the diameter of the slider to provide sufficient space for the slider to move during a vehicle collision.

8. The structure of claim 5, wherein the width of the connecting passage is set based on required rigidity of a vehicle body, a degree to which the dash panel is pushed during a vehicle collision, and an angular relationship between the first strut bar and the second strut bar.

\* \* \* \* \*